UNITED STATES PATENT OFFICE.

EDWARD D. FROHMAN, OF PITTSBURGH, PENNSYLVANIA.

REFRACTORY MATERIAL.

1,372,016.     Specification of Letters Patent.     Patented Mar. 22, 1921.

No Drawing.     Application filed December 8, 1919. Serial No. 343,225.

*To all whom it may concern:*

Be it known that I, EDWARD D. FROHMAN, residing at Pittsburgh, in the county of Allegheny and State of Pennsylvania, a citizen of the United States, have invented or discovered certain new and useful Improvements in Refractory Materials, of which improvements the following is a specification.

As is well known in the art, a mixture of fire clay and siliceous material, such as ganister, asbestos, etc., will begin to coalesce at about 2500 degrees F. and that by adding sodium silicate to such a mixture a permanent binding of the materials will begin at a lower temperature, dependent upon the amount of sodium silicate added. The objection to this mixture is the difficulty of preparing it for application at the point of use on account of the slow solubility of the sodium silicate.

The object of the invention described herein is to provide a mixture of fire clay, siliceous material and another material which is readily soluble in water and when so dissolved will form a binder having an efficiency equal to that of the sodium silicate.

Shipment of materials mixed with sodium silicate requires the employment of liquid tight receptacles and freight must be paid on the liquid contents, whereas the mixture claimed herein may be shipped in any kind of receptacles which will protect it from moisture and no freight is paid on mere liquid.

In the practice of the invention fire clay and siliceous material as ganister or asbestos in a powdered or finely divided condition and finely divided dextrin, gum arabic or other vegetable compound which when mingled with water will form a binder, are thoroughly mixed together. The fire clay and siliceous material may be used in equal or any desired relative proportions and the vegetable compound, as dextrin or gum arabic is added in amounts varying from one to ten per cent. of the entire mass of other materials. The percentage of binder depends upon the coarseness of the ganister, the coarser the grains the greater the percentage of binder required.

This mixture of materials can be readily shipped to the point of use and rendered capable of use merely by the addition of water in quantities dependent upon the consistency desired.

As is well known in the art, a mixture of fire clay and siliceous material can be rendered plastic by the addition of water, but when such mass is dried out it cracks and crumbles. When sodium silicate is used as a binder no cracking or crumbling will occur and the same is true of the mixture claimed herein, which however has the advantage that it may and can be shipped in a dry condition and prepared for use by the addition of water.

I claim herein as my invention:

A refractory material consisting of a mixture of finely divided dry fire clay, siliceous material and a vegetable compound capable when mingled with water of forming a binder.

In testimony whereof, I have hereunto set my hand.

EDWARD D. FROHMAN.